United States Patent
Ellä et al.

(10) Patent No.: US 9,106,283 B2
(45) Date of Patent: Aug. 11, 2015

(54) MULTI ANTENNA COMMUNICATION DEVICE WITH IMPROVED TUNING ABILITY

(75) Inventors: Juha Ellä, Halikko (FI); Pekka Ikonen, Espoo (FI)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 14/356,586

(22) PCT Filed: Nov. 7, 2011

(86) PCT No.: PCT/EP2011/069561
§ 371 (c)(1),
(2), (4) Date: Aug. 22, 2014

(87) PCT Pub. No.: WO2013/068030
PCT Pub. Date: May 16, 2013

(65) Prior Publication Data
US 2015/0043669 A1 Feb. 12, 2015

(51) Int. Cl.
*H04B 7/02* (2006.01)
*H04B 7/04* (2006.01)
*H01Q 1/52* (2006.01)
*H01Q 21/28* (2006.01)
*H04L 5/14* (2006.01)

(52) U.S. Cl.
CPC ............. *H04B 7/0417* (2013.01); *H01Q 1/521* (2013.01); *H01Q 21/28* (2013.01); *H04B 7/0426* (2013.01); *H04L 5/14* (2013.01); *H04B 7/0413* (2013.01)

(58) Field of Classification Search
CPC .................. H04L 27/2647; H04L 25/03038; H04B 1/1027; H04B 1/1036; H04B 2001/1045; H04B 2001/1063; H04B 1/1081; H04B 1/109; H04B 1/123
USPC .......... 375/267, 285, 316, 346, 348, 349–350; 455/101, 106, 114.2
See application file for complete search history.

(56) References Cited

U.S. PATENT DOCUMENTS

| | | | |
|---|---|---|---|
| 6,055,422 A | 4/2000 | Saitoh | |
| 8,432,234 B2 * | 4/2013 | Manssen et al. | 333/17.3 |
| 2001/0016477 A1 | 8/2001 | Harano | |
| 2010/0238075 A1 * | 9/2010 | Pourseyed | 343/702 |
| 2010/0248651 A1 * | 9/2010 | Dent | 455/78 |
| 2011/0210901 A1 | 9/2011 | Tikka et al. | |
| 2012/0295554 A1 * | 11/2012 | Greene et al. | 455/77 |
| 2013/0328734 A1 * | 12/2013 | Thind | 343/745 |
| 2014/0113679 A1 * | 4/2014 | Wehrmann et al. | 455/550.1 |

FOREIGN PATENT DOCUMENTS

| | | |
|---|---|---|
| JP | 8008797 A | 1/1996 |
| WO | 2010/052150 A1 | 5/2010 |
| WO | 2011/134492 A1 | 11/2011 |
| WO | 2012/089236 A1 | 7/2012 |

* cited by examiner

*Primary Examiner* — Khanh C Tran
(74) *Attorney, Agent, or Firm* — McDermott Will & Emery LLP

(57) ABSTRACT

A wireless communication device (WCD) having improved tuning abilities is provided. The device comprises an absorption element (AE) connected to an additional antenna (MIMOA). RF power coupled from a main antenna (MA) into the additional antenna (MIMOA) is absorbed instead of being re-emitted into the main antenna (MA) and disturbing measurement of the reflected power level.

17 Claims, 3 Drawing Sheets

MULTI ANTENNA COMMUNICATION DEVICE WITH IMPROVED TUNING ABILITY

Figure 1:
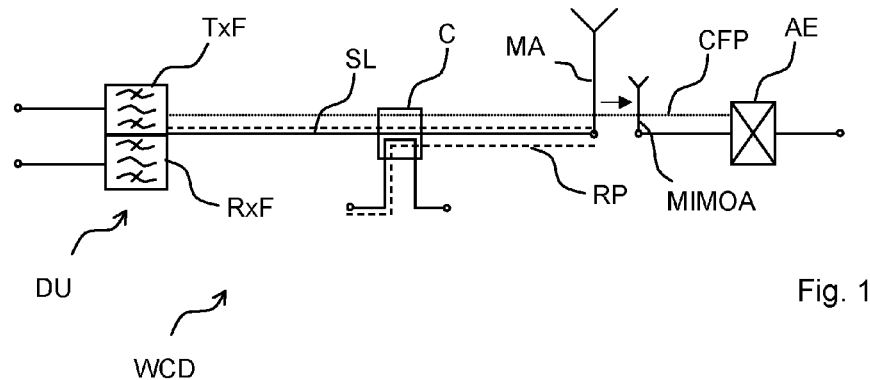

The present invention refers to communication devices with improved tuning ability where the device comprises two or more antennas.

Modern wireless communication devices are able to transmit and/or receive RF signals of different communication standards and/or different frequency bands. Therefore, they may comprise two or more antennas. For example, in MIMO (multiple input multiple output) systems, a wireless communication device comprises a main antenna and a MIMO antenna as an additional antenna for improved antenna performance when used as diversity antenna and for improved data rates when used as a true MIMO antenna.

In this context, a MIMO system is a communication system in which a main antenna and an additional antenna—the MIMO antenna—can be in use simultaneously operating at the same frequency range. Examples thereof are systems that can use standards such as IEEE 802.11 N (WIFI), 4G, 3GPP, LTE (long-term evolution), WIMAX or HSPA+.

In a modern communication system the transmitted power levels towards the antenna need to be controlled accurately. Hence, a typical wireless communication device utilizes methods of determining the forward and reflected power at the main antenna port. This information can be used to control the power amplifier output level. Often it is also used to control an antenna impedance matching circuit. The antenna matching circuit is used to optimize the antenna performance at the used frequency and sometimes also to compensate for user effects, e.g. user's hand disturbing the antenna impedance.

It was found that a finite isolation, e.g. caused by electromagnetic coupling, between the main antenna and a MIMO antenna results in a severe reduction of the ability of the device to accurately monitor the forward and reflected power or the SWR (standing wave ratio) calculated from these two parameters. Especially the ability to tune transmission or reception via an antenna, e.g. the main antenna or the MIMO antenna, may be degraded.

Tuning may be done based on the measured SWR (standing wave ratio) of signals propagating in a signal path. It was further found that—due to finite isolation—signals transmitted via one antenna, e.g. the main antenna, may be coupled to the respective other antenna, e.g. the MIMO antenna. The signal may be reflected at circuit elements connected to this antenna. Such a circuit may be an RX filter of the MIMO antenna. The reflected signal may be re-emitted and coupled into the main antenna.

User interaction, e.g. a user's hand in the vicinity of an antenna, deteriorates the transmission or receiving ability of an antenna. Thus, modern communication devices are able to compensate such interaction.

Antenna termination circuits are known, for example, from US 2011/0210901 A1.

The $SWR=(V_F+V_R)/(V_F-V_R)$ depends on the power of the forward RF signals $V_F$ and the power of the signals reflected from the antenna port of the main antenna $V_R$. Thus, the signal coupled from the MIMO antenna into the main antenna superimposes the signals reflected from the main antenna port $V_R$. Accordingly, the measured power of the reflected signal $V_R$ comprises an unwanted component resulting in a miscalculation of the SWR. Thus, the accuracy of the actual tuning is reduced.

A special problem of signals from the main antenna being reflected at an Rx filter connected to the MIMO antenna is that the reflectivity of the Rx filter is very frequency selective at frequencies within a vicinity of the working frequency of the Rx filter. As a result, the calculated SWR at the transmitted frequency comprises severe ripple deriving from ripple of the frequency depending transfer function of an RF filter, e.g. the Rx filter.

It is, thus, an object of the invention to provide a wireless communication device with improved ability to measure accurately the forward and reflected power, thus, also improving the tuning ability. It is especially an object of the invention to provide a wireless communication device in which the power of RF signals emitted by a main antenna, reflected by a circuit connected to a MIMO antenna, re-emitted by the MIMO antenna, coupled into the main antenna and superimposing the power of RF signals reflected from the main antenna's antenna port is reduced. Further, it is an object of the invention to provide a method for driving a wireless communication device having a main antenna and a MIMO antenna.

For that, a wireless MIMO communication device according to claim 1 and a method for driving a wireless MIMO communication device is provided. Dependent claims provide preferred embodiments of the invention.

The wireless MIMO communication device comprises a signal line and a main antenna connected to the signal line. The device further comprises a MIMO antenna and an absorption element connected to the MIMO antenna. RF signals, e.g. Tx and/or Rx signals, of a main frequency band can propagate in the signal line. The absorption element absorbs RF signals of the main frequency band.

In this context, "connected" refers to an electrical connection. The signal line may serve as a propagation medium for Tx or Rx signals transmitted or received via the main antenna. The MIMO antenna may be an additional antenna for additionally transmitting or receiving RF signals. The phrase "main frequency band" denotes the frequency band of RF signals being transmitted or received via the main antenna. The absorption element is connected to the MIMO antenna. It can absorb RF signals of the main frequency band. Thus, signals coupled from the main antenna into the MIMO antenna can be eliminated, e.g. by conducting them to a ground potential. Thus, the power of signals re-emitted by the MIMO antenna is reduced and the SWR of RF signals propagating in the signal line can be determined with a higher accuracy resulting in an improved tuning ability of the wireless communication device.

The absorption element may be frequency selective as a wide band absorptive element may not allow the use of the MIMO for reception. Thus, the absorptive function can comprise a combination of a filter functionality and a resistive termination.

In one embodiment, the communication device further comprises a coupler connected to the signal line. The coupler is able to detect the forward power and the reflected power of signals propagating in the signal line.

For that, the coupler can extract a certain amount of power propagating in the forward direction, i.e. in a direction towards the main antenna, and extract a certain amount of power propagating in the reverse direction, i.e. deriving from the main antenna port. The coupler can, for example, extract 1%, 5% or 10% of the propagating power. Then, the respective power can be determined and a circuit, e.g. a logic circuit, can calculate the respective impedance mismatch of the antenna by evaluating the SWR. The coupler can be a conventional coupler.

In one embodiment, the communication device further comprises an impedance matching network connected to the signal line. The impedance matching network can comprise elements of variable impedance, e.g. capacitance elements with variable capacitance or inductance elements with variable inductance. Based on the determined SWR, a logic circuit can determine the impedance of the impedance matching network by choosing a value for the variable capacitance of the capacitance element or a value for the variable impedance of the impedance element.

Thus, the device's antenna performance can be tuned by means of an impedance matching network as the determined actual matching based on the measured SWR is gained with a higher accuracy.

A variable impedance element can comprise a capacitance element of variable capacitance, e.g. a MEMS capacitance element or a switched capacitor bank.

In one embodiment, the communication device further comprises a duplexer connected to the signal line. The duplexer is frequency selective and can conduct transmission signals from a transmission port into the signal line and receiving signals from the signal line into a receiving port. Thus, the receiving port and the transmission port are decoupled and the communication device can transmit and receive RF signals via the main antenna simultaneously.

In one embodiment, the communication device further comprises a switch connected to the signal line. A switch can be used instead of a duplexer to separate or decouple a transmission port from a receiving port.

However, it is also possible to electrically connect the respective output ports of a plurality of duplexers via the switch to the signal line. Such a communication device can work in different main frequency bands and transmit and receive RF signals of a respective frequency band via the respective duplexer simultaneously.

In one embodiment, the absorption element comprises a duplexer. The absorption element is the element causing a reduction of unwanted RF power within the signal line. In a MIMO system, it is possible that the MIMO antenna is only provided for receiving RF signals. Then, in conventional MIMO communication devices, an Rx filter would be connected to the MIMO antenna. Such an Rx filter is strongly frequency selective, e.g. at Tx frequencies within the main frequency band causing ripple in the calculated SWR. By providing a duplexer connected to the Rx antenna, signals coupled from the main antenna into the MIMO antenna, e.g. at the Tx frequency, can be eliminated without coupling these unwanted signals into the Rx path connected to the MIMO antenna. For that, the duplexer connected to the MIMO antenna comprises an Rx filter which Rx signals can pass. The additional—Tx—filter having a low reflectivity at Tx frequencies of the main frequency band can electrically connect the MIMO antenna to a signal sink such as a 50 Ohm termination to strongly reduce or even eliminate the ripple.

Such a duplexer can provide a 50Ω termination at frequencies of the main Tx and Rx frequency bands and simultaneously provide a good signal sink or termination for Tx signals from the main antenna. A very high separation with regard to the Rx path is not necessary. Thus, low cost duplexers can be utilized. Further, the duplexer can be optimized to have a low reflectivity and/or a small size, i.e. small spatial dimensions or small volume. Then, the duplexer or its additional filter of the duplexer acts as the absorption element.

The duplexer can have a tunable impedance or a tunable passband frequency. Then, it is possible to provide a 50Ω termination for different frequencies within the main frequency band or within different main frequency bands.

In one embodiment, the absorption element comprises a plurality of duplexers and/or terminations of their ports, e.g. Tx ports. Then, a good and frequency-dependent termination of the MIMO antenna with respect to frequencies of different main frequency bands is provided, too.

In one embodiment, the absorption element comprises a switch. Then, different impedance elements can be connected to the MIMO antenna to absorb RF signals of different frequencies. Further, it is possible to provide a connection from the MIMO antenna to different Rx filters. Such a communication device is able to receive RF signals via the MIMO antenna of different frequencies.

In one embodiment, the absorption element comprises a plurality of duplexers which may be electrically connected or connectable to the MIMO antenna via a switch.

In one embodiment, the communication device provides multi-band input and output communication.

In one embodiment, the device comprises a duplexer connected to the signal path and a duplexer in the absorption element having a lower reflectivity in the main frequency band than the duplexer connected to the signal path. The signal line's duplexer can be optimized for a good separation between a Tx and an Rx path connected to the main antenna. A high separation level is not necessary for the duplexer in the absorption element which can be optimized with regard to reflectivity or insertion loss, then.

In one embodiment, the device comprises a duplexer connected to the signal path and a duplexer in the absorption element having a smaller volume than the duplexer connected to the signal path. Again, the duplexer connected to the signal path can be optimized to provide a high separation level between a Tx path and an Rx path of the communication device. The absorption element's duplexer does not need to provide a high separation and can be a low cost duplexer optimized to have a small volume.

In one embodiment, the communication device comprises a diplexer and an Rx filter in the absorption element. The diplexer can be used instead of a duplexer to conduct signals coupled from the main antenna into the MIMO antenna to ground to enhance the accuracy of the measured reflected power within the signal path.

In one embodiment, the MIMO antenna has a resistive 25Ω, 50Ω, or 100Ω termination for frequencies in the main Tx frequency band.

In one embodiment the wireless communication device is able to transmit to and/or receive RF signals from a base station at frequencies of the main frequency band. Further, the MIMO antenna is able to transmit to and/or receive RF signals from the base station at frequencies of the main frequency band, too. It is possible that the signals transmitted and/or received via the main antenna and via the MIMO antenna respectively are orthogonal and, thus, carry different information in two channels. This is in contrast to a CDMA (CDMA=Code Division Multiple Access) communication standard where the same signal is received from a base station via a main antenna and a diversity antenna to improve the signal quality of the analog signal.

It is possible that the MIMO antenna is only a receiving antenna.

A method for driving a wireless MIMO communication device is presented below. The communication device comprises a signal line, an impedance matching network connected to the signal line, a coupler connected to the signal line, and a main antenna connected to the signal line. The communication device further comprises a MIMO antenna and an absorption element connected to the MIMO antenna. The absorption element has a variable impedance. The method comprises the steps:

setting the impedance of the absorption element to a predefined value, determining the forward power and the reflected power in the signal line, tuning the impedance of the matching network and/or controlling the output level of the respective power amplifier.

Tuning the impedance of the matching network and controlling the output level of the power amplifier can be performed independently.

In one variant of the method, the device communicates simultaneously in the main frequency band via the main antenna and in an additional frequency band via the MIMO antenna.

Basic principles and exemplary embodiments are explained in the figures below.

SHORT DESCRIPTION OF THE FIGURES

Figure 2:
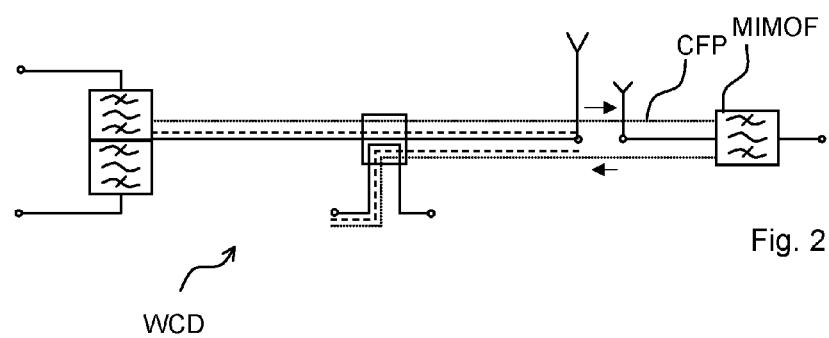
Figure 3:
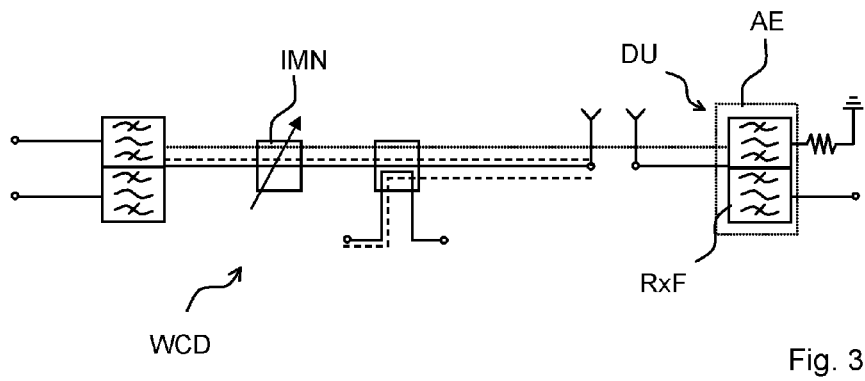
Figure 4:
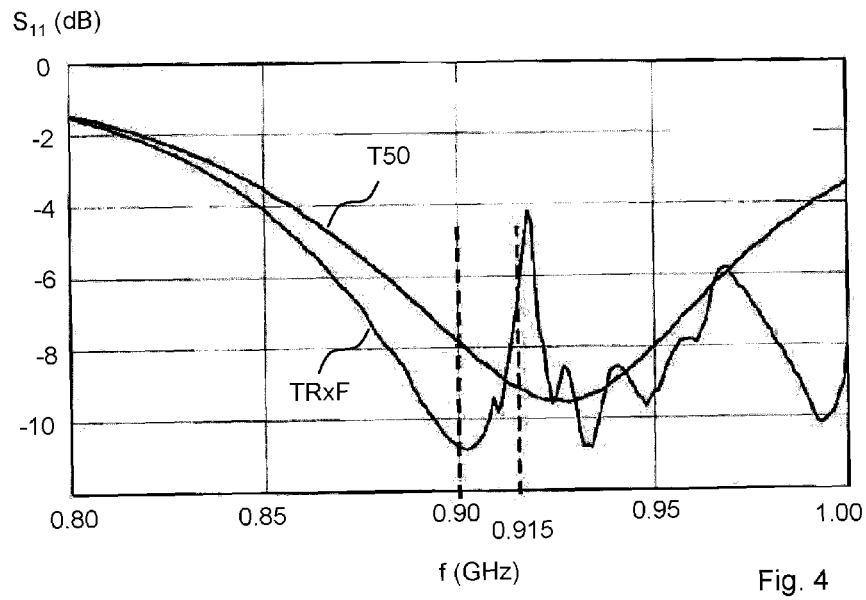
Figure 5:
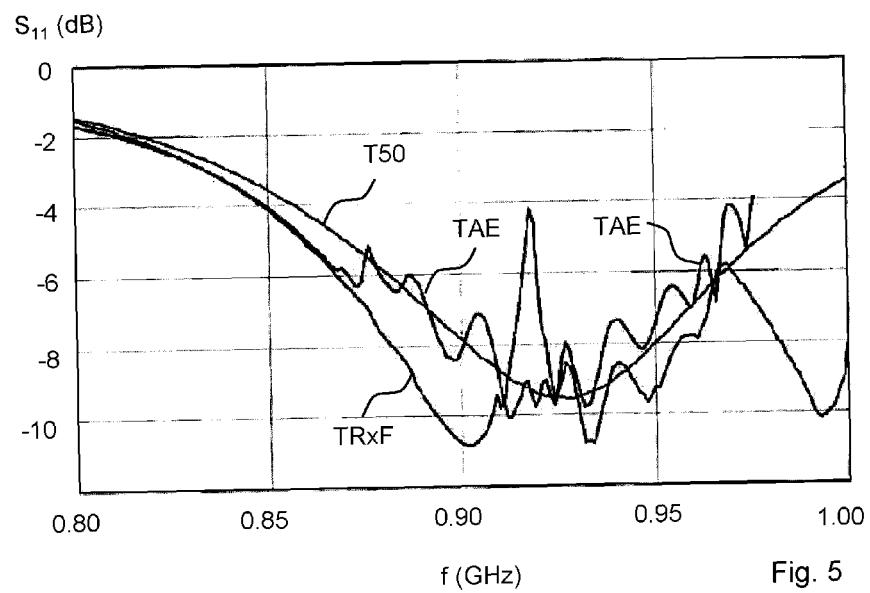
Figure 6:
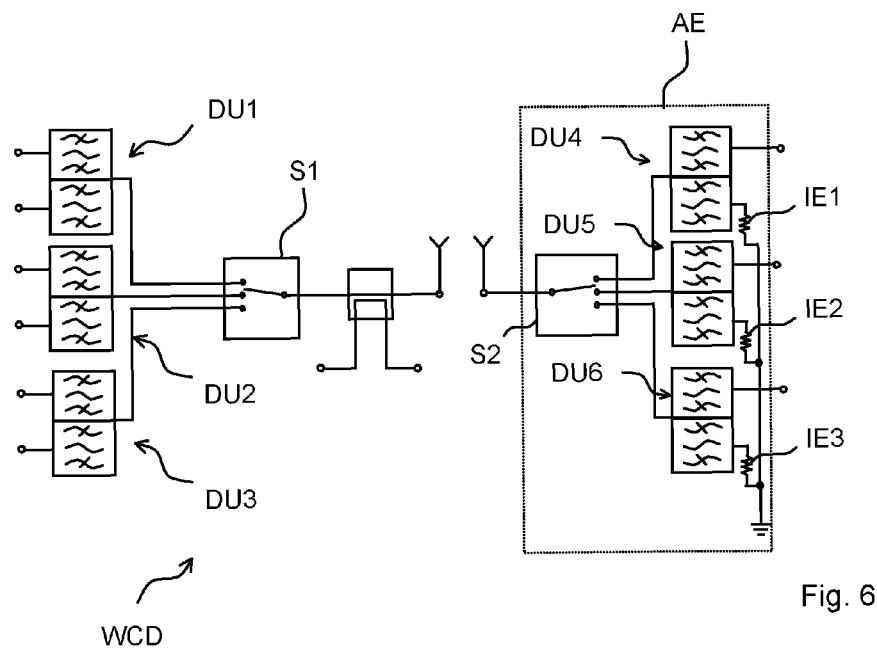
Figure 7:
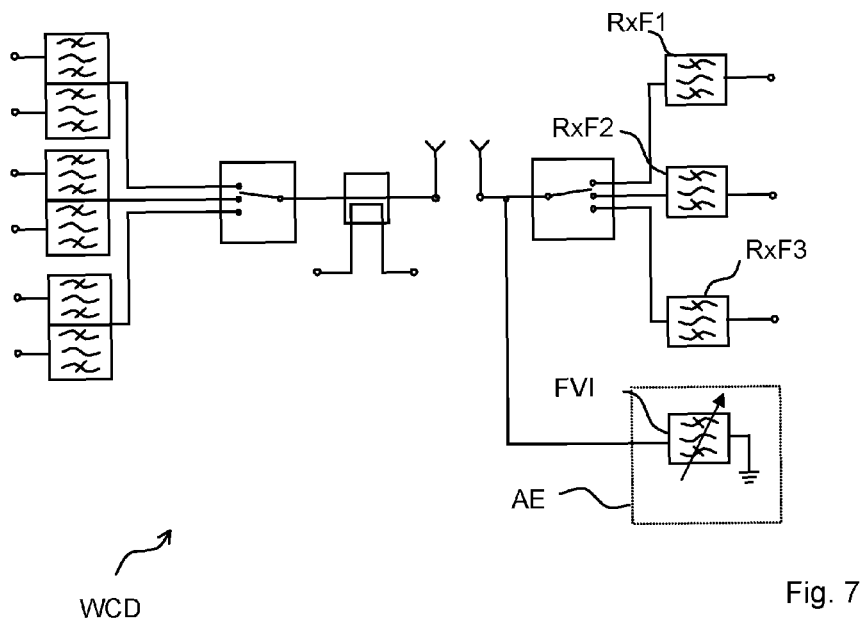

FIG. 1 shows schematically a wireless communication device comprising an absorption element AE connected to a MIMO antenna MIMOA, FIG. 2 shows the path of RF power disturbing the SWR measurement, FIG. 3 shows a wireless communication device where the absorption element comprises a duplexer, FIG. 4 shows the reflectivity of MIMO antennas with either a 50Ω termination or a termination via an Rx filter, FIG. 5 additionally shows the reflectivity of a MIMO antenna terminated via an absorption element, FIG. 6 shows schematically a wireless communication device comprising a plurality of duplexers connected to both the main antenna and the MIMO antenna, FIG. 7 shows an embodiment of a wireless communication device comprising switches and a filter of variable impedance.

DETAILED DESCRIPTION

FIG. 1 schematically shows an equivalent circuit diagram of a wireless communication device WCD. The device comprises a signal line SL electrically connecting a duplexer DU with a main antenna MA. A coupler C is connected to the signal line SL and enables to extract information about the forward and reflected power propagating in the signal line. The wireless communication device WCD further comprises a MIMO antenna MIMOA being electrically connected to an absorption element AE. The duplexer DU comprises a transmission filter TxF and a reception filter RxF. RF power is transmitted from the transmission filter TxF to the main antenna MA. A fraction RP of the transmitted RF power is reflected by an antenna port of the main antenna MA. A part of this fraction of the reflected power RP can be coupled out of the signal line by the coupler C. Further, coupler C can be utilized to couple a fraction of the forward power out of the signal line. Then, the standing wave ratio can be determined. Another fraction CFP is transmitted via the main antenna MA and coupled into the MIMO antenna MIMOA. This fraction propagates in a signal line from the MIMO antenna to the absorption element AE. The absorption element AE absorbs at least a part of fraction CFP. Thus, the accuracy in determining the SWR is enhanced.

The basic idea is not limited to a wireless communication device WCD comprising only two antennas. The device can comprise further antennas which may or may not be connected to one or more further absorption element.

FIG. 2 illustrates the situation where a part of the coupled forward power CFP is reflected at a filter connected to the MIMO antenna. Such a filter may be a bandpass filter or another Rx filter of a circuit connected to the MIMO antenna. The reflected part of the coupled forward power CFP may be coupled from the MIMO antenna back to the main antenna MA. As a consequence, this part superimposes the fraction of the forward power reflected by the antenna port of the main antenna and corrupts the measurement of the real reflected RF power.

FIG. 3 shows an embodiment of a wireless communication device WCD where the absorption element AE comprises a duplexer DU. The duplexer DU can comprise an Rx filter RxF for filtering receiving signals received by the MIMO antenna. The duplexer DU further comprises an additional filter, the output of which may be connected to ground, e.g. via an impedance element. Rx or Tx filters, e.g. the filter MIMOF of FIG. 2, are highly frequency selective at the working frequencies of wireless communication devices. The Tx filter part of the duplexer and its termination can be used to absorb all or parts of the Tx signal that is coupled from the main antenna, thus cancelling all of the signal that would otherwise be reflected back to the main antenna and corrupt the SWR measurement. The MIMO duplexer may work at the same frequency as the duplexer connected to the main antenna and provide similar selectivity. Thus, a plurality of duplexers can be used to cover several different frequency bands.

An impedance matching network IMN having a variable and tunable impedance is connected to the signal line.

FIG. 4 shows two different frequency dependent reflection curves as would be measured at the signal line going to the main antenna in the presence of a MIMO antenna. A desired curve is gained by a fixed impedance termination at the MIMO antenna, such as a 50Ω termination T50. However, since the MIMO antenna is used for reception, there would typically be a Rx filter at the MIMO antenna which has an impedance of 50 Ohm only in the Rx band, but which is highly reflective at the Tx frequency, where the reflection is measured at the main antenna. Due to the frequency selectivity of Rx filters, the curve denoted TRxF shows the reflection as measured when the MIMO antenna is terminated via an Rx filter according to FIG. 2. Since the Rx filter is very selective, severe ripple appears within the main frequency band. A Tx signal coupled into the MIMO antenna at 900 MHz would make the main antenna matching appear better than it actually is. On the other hand, at 915 MHz, the error signal would make the matching seem worse than the matching is in reality as the reflectivity is lower than the expected 50Ω termination.

FIG. 5, in contrast, shows an additional termination via an absorption element the curve of which is denoted by TAE. Although the termination is also realized by a filter component, e.g. such as an additional filter of a duplexer within the absorption element AE, the amplitude of the ripple is reduced and the accuracy in determining the SWR is enhanced, since now the Tx frequencies are terminated with a 50 Ohm load at the MIMO antenna.

FIG. 6 shows an embodiment of a wireless communication device WCD where the main antenna is connectable via a first switch S1 to a first duplexer DU1, to a second duplexer DU2, or to a third duplexer DU3. The number of ports of the first switch S1 and the number of duplexers connectable to the main antenna is not limited. Further ports or duplexers can be comprised by the device.

Furthermore, the MIMO antenna is connectable to a fourth duplexer DU4, to a fifth duplexer DU5, or to a sixth duplexer DU6 via a second switch S2. Correspondingly, the number of duplexers and ports is not limited; the device can comprise further duplexers and further ports of switch S2.

It is possible that each duplexer has an additional filter which is electrically connected to ground via a first, second, third impedance element IE1, IE2, IE3, . . . . Then, a good termination for different first Tx frequency bands can be obtained at the MIMO antenna.

FIG. 7 shows an embodiment of a wireless communication device WCD where the absorption element AE comprises a Tx filter of variable impedance FVI which may have a variable or tunable passband frequency so that it can be set to provide a good termination at different frequencies, i.e. to work in tandem with any of the duplexers connected to the main antenna.

If, for example, the device transmits signals on a first band (e.g. band 5, where the Tx frequency range is 824-849 MHz) then that tunable filter provides a passband and thus good termination of the MIMO antenna at this frequency. If the device then changes to second band, e.g. band 17 (Tx is 704-716 MHz), then the tunable filter changes its passband to this frequency.

Then, only one additional filter is necessary to obtain a good termination for a reduced RF power to be re-coupled into the main antenna.

A wireless communication device WCD can comprise further antennas and further filters that may serve as termination elements or absorption elements.

The invention is not restricted to a MIMO system. The basic principles concerning termination of an additional antenna can be utilized in every communication device comprising two or more antennas.

LIST OF REFERENCE SIGNS

AE: absorption element
C: coupler
CFP: coupled forward power
DU: duplexer
DU1, 2, 3, 4, 5, 6: duplexer
FVI: filter of variable impedance
IE1, 2, 3: impedance element
IMN: impedance matching network
MA: main antenna
MIMOA: MIMO antenna
MIMOF: filter connected to the MIMO antenna
RP: power reflected by the main antenna's port
RxF: reception filter
RxF1, 2, 3: reception filter
S1, S2: first, second switch
SL: signal line
T50: 50Ω termination
TAE: termination via an absorption element
TRxF: termination via a reception filter
TxF: transmission filter
WCD: wireless communication device

The invention claimed is:

1. A wireless MIMO communication device (WCD), comprising:
a signal line (SL) and a main antenna (MA) connected to the signal line (SL);
a MIMO antenna (MIMOA) and an absorption element (AE) connected to the MIMO antenna (MIMOA), where
RF signals of a main frequency band can propagate in the signal line (SL),
the absorption element (AE) absorbs RF signals of the main frequency band; and
a coupler (C) connected to the signal line (SL), where
the coupler (C) is able to detect the forward power and the reflected power of the signals propagating in the signal line (C).

2. The device according to claim 1, further comprising an impedance matching network (IMN) connected to the signal line (SL).

3. The device according to claim 1, further comprising a duplexer (DU) connected to the signal line (SL).

4. The device according to claim 1, further comprising a plurality of duplexers (DU1, DU2, DU3) connected to the signal line (SL).

5. The device according to claim 1, further comprising a switch (SW) connected to the signal line (SL).

6. The device according to claim 1, where the absorption element (AE) comprises a duplexer (DU).

7. The device according to claim 6, where the impedance of the absorption element's duplexer (DU) is tunable.

8. The device according to claim 1, where the absorption element (AE) comprises a plurality of duplexers (DU4, DU5, DU6).

9. The device according to claim 1, where the absorption element (AE) comprises a switch (SW).

10. The device according to claim 1, provided for multi band input and output communication.

11. The device according to claim 1, comprising a duplexer (DU) connected to the signal line (SL) and a duplexer (DU) in the absorption element (AE) having a lower reflectivity in the main frequency band than the duplexer (DU) connected to the signal path.

12. The device according to claim 1, comprising a duplexer (DU) connected to the signal line (SL) and a duplexer (DU) in the absorption element (AE) having a smaller volume than the duplexer (DU) connected to the signal line (SL).

13. The device according to claim 1, comprising a diplexer and a Rx filter in the absorption element (AE).

14. The device according to claim 1, where the MIMO antenna (MIMOA) has a resistive 25Ω, 50Ω, or 100Ω termination in the main Tx frequency band.

15. A method for driving a wireless MIMO communication device (WCD), comprising a signal line (SL), an impedance matching network (IMN) connected to the signal line (SL), a coupler (C) connected to the signal line (SL) and a main antenna (MA) connected to the signal line (SL), a MIMO antenna (MIMOA), and an absorption element (AE) connected to the MIMO antenna (MIMOA), the absorption element (AE) having a variable impedance, the method comprising the steps
setting the impedance of the absorption element (AE) to a predefined value,
determining the forward power and the reflected power in the signal line (SL),
controlling the output level of a respective power amplifier.

16. The method according to claim 15, comprising the step tuning the impedance of the impedance matching network (IMN) and/or controlling the output level of the respective power amplifier.

17. The method according to claim 15, where the device communicates simultaneously in the main frequency band via the main antenna (MA) and in an additional frequency band via the MIMO antenna (MIMOA).

* * * * *